United States Patent
Casey et al.

(10) Patent No.: US 7,269,132 B1
(45) Date of Patent: Sep. 11, 2007

(54) METHOD AND APPARATUS FOR ACHIEVING TRANSPARENT REDUNDANCY AT A HIERARCHICAL BOUNDARY

(75) Inventors: Liam Maurice Casey, Ottawa (CA); David Ian Allan, Ottawa (CA)

(73) Assignee: Nortel Networks, Ltd., St. Laurent, Quebec (CA)

( * ) Notice: Subject to any disclaimer, the term of this patent is extended or adjusted under 35 U.S.C. 154(b) by 1149 days.

(21) Appl. No.: 10/172,930

(22) Filed: Jun. 17, 2002

Related U.S. Application Data (60) Provisional application No. 60/358,811, filed on Feb. 22, 2002.

(51) Int. Cl.
- *G01R 31/00* (2006.01)
- *H04J 3/14* (2006.01)
- *H04L 12/26* (2006.01)
- *H04L 12/56* (2006.01)

(52) U.S. Cl. ............... 370/219; 370/397; 370/399; 370/409; 370/467

(58) Field of Classification Search ............... None
See application file for complete search history.

(56) References Cited

U.S. PATENT DOCUMENTS

| | | | | |
|---|---|---|---|---|
| 6,920,133 B1 * | 7/2005 | Boodaghians | ............... | 370/389 |
| 6,965,572 B1 * | 11/2005 | Boodaghians | ............... | 370/249 |
| 7,012,933 B2 * | 3/2006 | Mark et al. | ............... | 370/487 |
| 7,020,150 B2 * | 3/2006 | Ho et al. | ............... | 370/412 |
| 7,065,084 B2 * | 6/2006 | Seo | ............... | 370/392 |
| 7,082,140 B1 * | 7/2006 | Hass | ............... | 370/466 |
| 7,093,160 B2 * | 8/2006 | Lau et al. | ............... | 714/11 |

OTHER PUBLICATIONS

Internet Engineering Task Force (IETF) Request For Comments (RFC) 2338, Virtual Router Redundancy Protocol, S. Knight, et al., Apr. 1998.
IETF RFC 2547, BGP/MPLS VPNs, E. Rosen, et al., Mar. 1999.
IETF RFC 2917, A Core MPLS IP VPN Architecture, K. Muthukrishnan, et al., Sep. 2000.
IETF RFC 3031, Multiprotocol Label Switching Architecture, E. Rosen, et al. Jan. 2001.
IETF RFC 3032, MPLS Label Stack Encoding, E. Rosen, et al., Jan. 2001.

(Continued)

*Primary Examiner*—Chi Pham
*Assistant Examiner*—Soon D. Hyun
(74) *Attorney, Agent, or Firm*—John C. Gorecki (57) ABSTRACT

Transparent redundancy may be achieved at a MPLS-MPLS hierarchical boundary or a BMA-MPLS hierarchical boundary by utilizing local repair mechanisms extant in each domain to select automatically the same boundary network devices as the primary and secondary boundary network devices. In the MPLS domain, two LERs advertise the ability to forward traffic to a phantom LER and map all traffic originated into that domain as having been on a path originating at the phantom LER. This will cause the LERs to appear as being one hop away from the phantom LER, causing MPLS to assume the real LERs are part of a LSP terminating at the phantom LER. MPLS local repair will thus establish one of the LERs as the primary LER and the other LER as the secondary LER. In an Ethernet domain, each boundary network device is treated analogously to a router in the VRRP scheme for routers.

33 Claims, 3 Drawing Sheets

OTHER PUBLICATIONS

Framework for MPLS-based Recovery, http://search.ietf.org/internet-drafts/draft-ietf-mpls-recovery-frmwrk-03.txt, V. Sharma, et al., Jul. 2001.

Encapsulation Methods for Transport of Layer 2 Frames Over IP and MPLS Networks, http://www.ietf.org/internet-drafts/draft-martini-12circuit-encap-mpls-04.txt, L. Martini, et al. Nov. 2001.

* cited by examiner

METHOD AND APPARATUS FOR ACHIEVING TRANSPARENT REDUNDANCY AT A HIERARCHICAL BOUNDARY

BACKGROUND OF THE INVENTION

1. Field of the Invention

The present invention relates to communication networks and, more particularly, to a method and apparatus for achieving transparent redundancy at a hierarchical boundary in a communication network.

2. Description of the Related Art

Data communication networks may include various computers, servers, nodes, routers, switches, hubs, proxies, and other devices coupled to and configured to pass data to one another. These devices will be referred to herein as "network devices." Data is communicated through the data communication network by passing data packets (or data cells or segments) between the network devices by utilizing one or more communication links. A particular packet may be handled by multiple network devices and cross multiple communication links as it travels between its source and its destination over the network.

The various network devices on the communications network communicate with each other using predefined sets of rules, referred to herein as protocols. Different protocols are used to govern different aspects of the communication, such as how signals should be formed for transmission between network devices, various aspects of what the data packets should look like, and how packets should be handled by the network devices. A group of network devices communicating via a given protocol or instantiation of a protocol will be referred to herein as a "domain." Depending on how the network has been set up, a given packet of data may pass through multiple domains as it makes its way through the communications network. The interface between domains will be referred to herein as a hierarchical boundary in the communication network. A network device sitting on a hierarchical boundary will be referred to as a boundary network device.

Two protocols of particular interest herein are Multiprotocol Label Switching (MPLS) and Broadcast Multiple Access (BMA) protocols, such as Ethernet. MPLS is a protocol that is designed to set up paths through a packet network by applying labels to packets on a particular flow. When packets enter a MPLS-based network, Label Edge Routers (LERs) give them a label (identifier). Packets are classified into groups known as forwarding equivalence classes (FECs) which are packets that will get a common treatment by the MPLS network. The FEC may be expressed as forwarding rules derived from the routing table entry (i.e., destination, bandwidth, delay, and other metrics), and may also refer to the IP header field (source IP address), Layer 4 socket number information, differentiated service field, etc. The FEC is mapped to a corresponding LSP which instantiates the correct handling by the network. It is locally instantiated as a label "binding" on a particular interface. Once this classification into FECs is complete and the FEC to LSP binding obtained, the payload packets are forwarded on the corresponding Labeled Switch Paths (LSPs). With these LSPs, network operators can divert and route traffic based on data-stream type and Internet-access customer.

A BMA protocol such as Ethernet, by contrast, specifies that a network device is to send a packet to any nodes on the network in the domain without discriminating as to whether the adjacent nodes need to receive the packet. Within a shared Ethernet subnet, all network elements will receive broadcast traffic, and the receiver uses the embedded addressing (known as media access control or MAC addresses) to determine whether to accept or discard the packet.

Within the OSI networking model, Ethernet is considered to be a link layer protocol. Most proponents of MPLS do not consider MPLS as a unique layer within this model, however it is useful to similarly consider it as a link layer protocol as it implements a unique forwarding plane. As described in greater detail in IETF RFC 3032, the content of which is hereby incorporated herein by reference, Ethernet may carry MPLS via the use of encapsulation/overlay techniques. Likewise, as described in greater detail in http://www.ietf.org/internet-drafts/draft-martini-12circuit-encap-mpls-04.txt, the content of which is hereby incorporated herein by reference, MPLS may carry Ethernet. Further, MPLS implements arbitrary hierarchy, that is to say that MPLS protocol data units (PDUs) can carry MPLS PDUs whereby layers recursively stack. This introduces a number of challenges in creating a highly reliable network, as hierarchical boundaries are normally single points of failure in the network, and an arbitrary number of hierarchical boundaries may be traversed by a given end-to-end path across the network.

Figure 1:
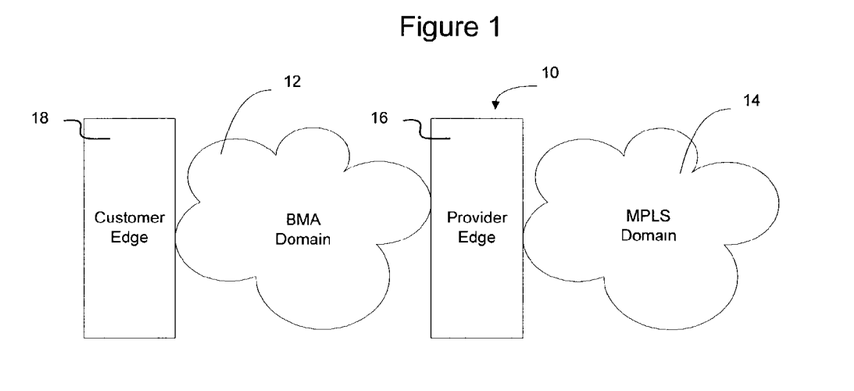
FIGS. 1 and 2 are functional block diagrams of networks including a hierarchical boundary between a broadcast domain and an MPLS domain.
Figure 2:
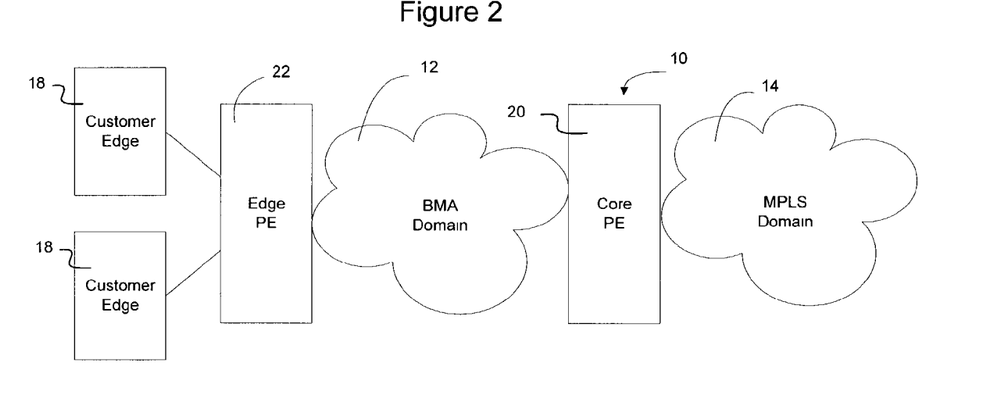
Figure 3:
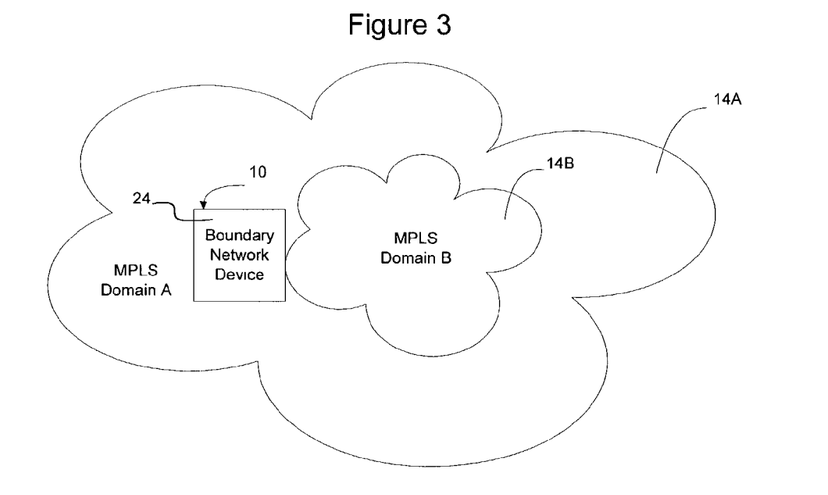
FIG. 3 is a functional block diagram of a network including a hierarchical boundary between two MPLS domains.

FIGS. 1-3 illustrate several examples of networks in which a hierarchical boundary 10 exists between two domains. In the example illustrated in FIG. 1, a provider edge network device 16 sits at the hierarchical boundary 10 between a broadcast domain 12 and a MPLS domain 14. In this example, customer traffic on a customer's local area network (not shown) is transmitted from a customer edge network device 18 through the broadcast domain 12 to the provider edge network device 16. The provider edge network device 16 aggregates traffic from various customers and packages it for transmission over the network forming the MPLS domain 14.

In the example illustrated in FIG. 2, a core provider edge network device (Core PE 20) sits at a hierarchical boundary 10 between the broadcast domain 12 and the MPLS domain 14. In this example, customer traffic on a customer's local area network (not shown) is transmitted from the customer edge network device 18 to an edge provider edge network device (Edge PE 22). The Edge PE network device 22 aggregates customer traffic and sends it over the network forming the broadcast domain 12 to the Core PE network device 20. The Core PE network device 20 then transmits the incoming traffic, as necessary, over the network forming the MPLS domain 14.

In the example illustrated in FIG. 3, a boundary network device 24 sits at the hierarchical boundary 10 between MPLS domain A (14A) and MPLS domain B (14B). Hierarchical boundaries of this nature are typically formed where multiple layers of MPLS labels are applied to a given traffic flow, for example, where a second MPLS label is attached to packets in an existing MPLS flow for transmission across another network or another part of the network. Many other network topographies may be envisioned employing hierarchical boundaries between a broadcast domain and a MPLS domain, or between multiple MPLS domains, and the invention, as described below, is not limited to these few examples of hierarchical boundaries in communications networks.

As data networks have grown in complexity and speed, the network devices used in those networks have likewise increased in complexity and speed. Unfortunately, this complexity provides manifest opportunities for the network to fail. To increase reliability of the network, networks are designed such that in the event of a failure of a network device or link, an alternate network device or link may be used until a repair can be made to the failed element. This notion will be referred to herein as "redundancy." Where the repair works around the failure by selecting an alternate network device or link, the repair will be referred to as a local repair. Where the repair establishes an entirely new end-to-end path through the domain, the repair will be referred to as global repair.

As services offered over networks become increasingly complex, for example layer 2 and layer 3 virtual private networks (VPNs) are deployed, and virtual private LAN segment (VPLS) services are made available, redundancy becomes increasingly important, and also increasingly difficult. Specifically, the redundant network devices must share information as to the types of tunnels, etc. that are being set up to provide these services, so that in the event of failure of one network device another network device can continue to offer these specialized services. Ethernet networks have mechanisms to permit redundant domain interconnect (e.g. VRRP). MPLS provides for both path repair and segment repair mechanisms (known as global and local repair respectively) Global repair mechanisms will not be further considered as use of hierarchy simply results in bandwidth explosion. For local repair, additional backup paths are set up to circumvent any point of failure between the path egress and ingress, with the ingress and egress being points of failure. So if there are 'n' points of failure, there will be 'n' backup paths.

Unfortunately, to date there has been no satisfactory way to extend the local repair mechanisms to provide transparent redundancy at a hierarchical boundary. Specifically, since the local repair mechanisms specify an alternate path around the broken network device or link, any attempt at repairing a boundary network device would necessarily result in traffic crossing the hierarchical boundary at a different point. Since there is no convenient or established way of coordinating this with the second domain, boundary network devices represent a single point of failure on the network.

SUMMARY OF THE INVENTION

The present invention overcomes these and other drawbacks by providing an apparatus and method for improving resiliency of the network by providing redundant ingress and egress points transparently at a hierarchical boundary. Specifically, redundancy may be provided at a MPLS-MPLS hierarchical boundary or at a BMA-MPLS hierarchical boundary by utilizing local repair mechanisms extant in the domains to select automatically, in each domain, the same boundary network devices as the primary and secondary boundary network devices. Thus, transparent redundancy may be established at a hierarchical boundary.

Normal operation for local repair is that as the working path is established, the intermediate nodes along the path compute and create backup paths that circumvent the immediate downstream points of failure. These are commonly referred to as "detours" or "bypass tunnels." The ability of MPLS to support multi-point to point connections supports this as the backup path may seamlessly rejoin to original working path downstream of the protected span. Such a local repair configuration nominally requires a single ingress point and a single egress point. Intelligent interworking of local repair setup can obviate the requirement for a single egress and ingress LSR by replicating the mechanisms as they would appear one hop into the redundant structure of LSPs.

According to one embodiment, redundancy may be provided at a hierarchical boundary between two MPLS domains by causing a pair of LERs to impersonate LSRs in each of the MPLS domains. Specifically, each of the LERs is instructed to advertise the ability to forward traffic to a phantom LER in each domain such that there is the appearance of a single egress point at the given MPLS level. At the same time redundant ingress points to the level mimic the establishment of a working path and backup path as if there were a single LER at the ingress. Since the traffic passing through the real LERs appears to the domain as being one hop away from the phantom LER, MPLS mechanisms that configure local repair will assume the real LERs are part of the LSP terminating at the phantom LER and will automatically establish a primary and a secondary path through the LERs. Additionally, since only the intended LERs will identify traffic with a particular phantom LER, the redundant boundary LERs will know with certainty which other candidate boundary LERs may be selected as the secondary LER by the MPLS local repair mechanisms, and can populate those network devices with appropriate state and control information.

Further it is easy to envision that redundant ingress LSRs will be able to intercept signaling associated with the establishment of working and backup paths and map them onto the reliability constructs at the next hierarchical level such that MPLS local repair will be offered seamlessly end to end regardless of the depth of the network hierarchy in the core.

According to another embodiment, redundancy is provided at a hierarchical boundary between an MPLS domain and an Ethernet domain. Specifically, redundancy is achieved within the Ethernet domain by treating each boundary network device analogously to a router in the VRRP scheme for routers. Boundary network devices are grouped into boundary network device redundancy groups, in which all boundary network devices have knowledge of each other, and one is designated as master and the rest are designated as standbys. On the MPLS domain side of the hierarchical boundary, the redundant ingress points into the reliability construct at the given level permits seamless interworking of the Ethernet/VRRP reliability mechanism with the MPLS local repair. By impersonating LSRs in the MPLS domain, the MPLS redundancy scheme will automatically establish the master and standby boundary network devices within the redundancy group as alternate egress points from the MPLS domain.

BRIEF DESCRIPTION OF THE DRAWINGS

Aspects of the present invention are pointed out with particularity in the appended claims. The present invention is illustrated by way of example in the following drawings in which like references indicate similar elements. The following drawings disclose various embodiments of the present invention for purposes of illustration only and are not intended to limit the scope of the invention. For purposes of clarity, not every component may be labeled in every figure. In the figures:

DETAILED DESCRIPTION

The following detailed description sets forth numerous specific details to provide a thorough understanding of the invention. However, those skilled in the art will appreciate that the invention may be practiced without these specific details. In other instances, well-known methods, procedures, components, protocols, algorithms, and circuits have not been described in detail so as not to obscure the invention.

As described in greater detail below, the method and apparatus of the present invention provides improved resiliency of the network by providing transparent redundancy at a hierarchical boundary. Specifically, redundancy may be provided at a MPLS-MPLS hierarchical boundary or at a BMA-MPLS hierarchical boundary by utilizing local repair mechanisms extant in the domains to select automatically, in each domain, the same boundary network devices as the primary and secondary boundary network devices. Thus, transparent redundancy may be established at the hierarchical boundary.

MPLS Domain

Multi-Protocol Label Switching (MPLS) is a common protocol used in many domains, which provides for point-to-point communication over the domain by specifying the endpoints and various intermediate points of a label-switched path.

There are two types of devices that participate in routing traffic over an MPLS network—label edge routers (LERs) and label switch routers (LSRs). An LER is a device that operates at the edge of the MPLS network and is responsible for establishing a label-switched path (LSP) through the network. An LSR is a network device in the MPLS network that participates in the label-switched path through the network. As described in IETF RFC 3031, the content of which is hereby incorporated herein by reference, in practice all nodes in the network are generally expected to have the capabilities of by both an LER and an LSR. The functional distinction discussed herein is thus applicable when considering an individual path through the network. In practice, however, the network devices may commonly perform functions of both an LER and an LSR, and the invention is not limited to network devices performing only the functions of an LER or only the functions of an LSR.

MPLS provides for built-in transmission redundancy and local repair throughout the domain by specifying alternate links and LSRs to be used in the event of failure of a link or LSR within the network along the primary label-switched path. The MPLS redundancy scheme is described in greater detail in Internet Draft "Framework for MPLS-based Recovery," by Vishal Sharma, et al., which may be found at http://search.ietf.org/internet-drafts/draft-ietf-mpls-recovery-frmwrk-03.txt, the content of which is hereby incorporated herein by reference.

While the MPLS redundancy scheme is able to provide redundancy for LSRs within the domain, it does not provide redundancy at the ingress and egress points to the domain, e.g., it does not provide for redundant LERs. According to one aspect of the invention, a LER is provided with the ability to impersonate a LSR within the MPLS network so that it appears to be an LSR on a LSP through the network. By impersonating a LSR in the MPLS network, MPLS local repair mechanisms will extend redundancy from the interior of the domain to the edge of the domain by automatically selecting an alternative LER as a backup should the primary LER fail.

Specifically, local repair schemes, as currently implemented, will seek route diversity between the working path and backup paths in reaching the path egress. Therefore if the network believes a phantom egress point exists, signaling procedures will establish redundant paths that transmit at least two network devices, which can be organized into a redundant federation. Most local repair schemes typically use one working and one backup path associated with any individual span. Therefore the network architecture will be typically constrained to a redundant pair of MPLS LSRs at any network hierarchical boundary. Thus, should the MPLS network experience difficulty forwarding traffic through the working path, it will automatically switch to the backup path. It should be noted that the concept of working and backup paths is decoupled from the concept of master and standby LERs. A working path may transmit a standby LSR, similarly a backup path may transmit a master LER. The distinction being control plane vs. forwarding plane roles. The control aspects require a clear association of the role of master with a processing entity, whereas simple promiscuous receive and forwarding into the redundant connectivity at the hierarchical boundary is all that is required of the forwarding plane.

To impersonate a LSR, according to one embodiment of the invention, the LER advertises to the MPLS domain the ability to forward traffic to a phantom LER, and the redundant LSRs at the hierarchical boundary collectively establish redundant structures as if there were a common phantom ingress point. If only a selected master network device and backup network device advertise the ability to forward packets to a particular phantom LER, the MPLS redundancy scheme will automatically establish the master and backup network devices as alternate egress points from the MPLS domain. These redundant egress points, either of which can accept traffic at any time, direct traffic into the next level of the hierarchy.

Knowing which LERs may be transited by the backup path for a particular working path enables the associated primary LER to populate the state tables of the secondary LERs with information required for the secondary to take over in the event of failure by the primary and to correctly interact with signaling traffic associated with the establishment of the backup path. For an ingress point to a given hierarchical level, this is in the form of the secondary LER initiating a bypass path around potential primary failure, and sufficient information to terminate working path requests or bypass path requests received for paths that would be clients of the current hierarchical level. (which would include correct label associations established for the client working path to permit the backup LSR to correctly "merge" the client backup into the client working path via cross connecting the client backup onto the same label). For an egress point, this would be sufficient knowledge to terminate working and backup path requests and initiate impersonating a local repair construct (working and bypass paths) into the client hierarchical level (including what label values are in the working path in order to properly cross connect backup paths). Further, the primary LER is able to choose the secondary LER, and thus is able to force the MPLS local repair mechanisms in the MPLS domain to adopt a convenient LER as the secondary for the primary LER. This enables the primary LER to ensure, for example, that the primary and secondary LERs are connected via a control link or other convenient mechanism to facilitate the exchange of tables and other normal control information. Additionally, the primary LER can use the information about the identity of the secondary LER to establish the same primary and secondary relationship in the adjacent domain, as described in greater detail below.

Figure 4:
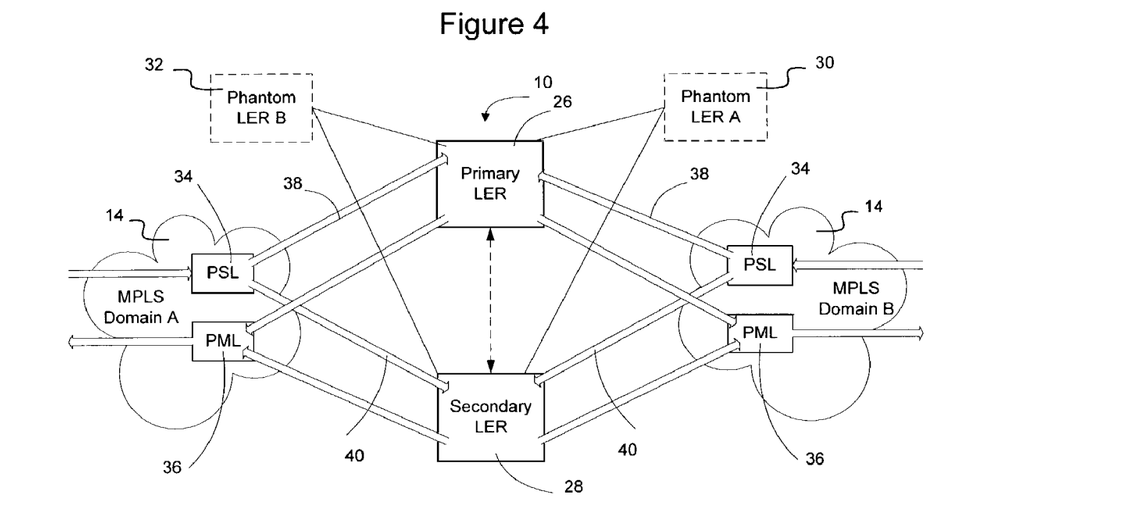
FIG. 4 is a functional block diagram illustrating an example of redundant network devices at an MPLS-MPLS hierarchical boundary.

FIG. 4 illustrates an example MPLS-MPLS hierarchical boundary in a communications network. As shown in FIG. 4, a hierarchical boundary 10 is established between a first MPLS domain A and a second MPLS domain B. Two boundary network devices 26, 28 are provided to establish redundant boundary network devices at the hierarchical boundary 10. Since the boundary network devices 26, 28 are operating in MPLS domains, they also are Label Edge Routers (LERs). While two boundary network devices are illustrated in FIG. 4 for convenience and so as to not obscure the invention, the invention is not limited to two boundary network devices but rather extends to any number of boundary network devices.

To establish redundant paths across the hierarchical boundary, the same boundary network devices must be selected by each domain as the primary boundary network device and the secondary boundary network device. According to one embodiment, the primary 26 and secondary 28 LERs map all traffic originated into MPLS domain A as being on paths that appear to be working and backup paths originating at phantom LER A 30. Similarly, the primary and secondary LERs mark all traffic originated into MPLS domain B as appearing to have originated with a phantom LER B 32. In each instance, the primary LER 26 is established as having the preferred route to the phantom LER. As discussed above, this will cause each of the MPLS domains to treat the LERs 26, 28 as LSRs, and local repair mechanisms in each of the domains 14A, 14B will establish the secondary LER 28 as an alternate egress for the primary LER 26. Accordingly, transparent redundancy may be achieved at the MPLS-MPLS hierarchical boundary.

In this embodiment, in each MPLS domain, the upstream path switch LSR (PSL) 34 will establish the working path "through" the primary LER and recovery paths "through" the secondary LER. In each case tunnel traffic will actually be terminated and directed to the master or standby boundary network device. The boundary network device receiving the traffic then uses the VC or service label information to index into the right forwarding table to determine how to forward the packets. For traffic originating at the boundary network device, the same approach can be used, whereby it all appears to come from the phantom LER and the first P node acts as a path merge LSR (PML) 46.

There are three possible failure scenarios in the MPLS domain. First, the link 38 between the PSL 34 and the primary LER 26 may fail, in which case the PSL 34 will protection switch to an alternate egress from the MPLS domain—in the illustrated embodiment link 40. Second, the primary LER 26 may fail, in which case either link failure or node adjacency failure will cause the PSL 34 to protection switch to an alternate egress link 40. Third, a link between the primary LER 26 and the adjacent domain may fail. In this case, the primary LER 26 may elect to protection switch itself to an alternate egress, or may elect to commit suicide, and force the PSL 34 to protection switch to the alternate egress link 40. Note that failure of the PSL 34 will be handled by the normal MPLS redundancy scheme.

Because the secondary LER 28 has advertised as being able to get packets to the phantom LER 42, the secondary LER 28 will be automatically selected as the backup egress. Thus, if the correct configuration of recovery path has been done by the upstream PSL 34, all traffic for the primary LER 26 will be diverted automatically to the secondary LER 28 once a problem has been detected with the primary LER 26. Since the primary LER 26 and secondary LER 28 have been communicating, as discussed above, the secondary LER 28 has a copy of the state/forwarding tables and is able to forward the traffic over the adjacent domain.

For signaling protocols supporting local repair mechanisms (e.g. RSVP-TE) or those that use direct adjacencies at a given level (e.g. LDP), the failure of a redundant LSR does not have specific signaling implications as the protocols are already designed with such specific outages in mind, and/or there is no protocol exchange directly with the phantom LER. However if the redundant LSRs are required in the architecture to have the phantom LER host a protocol termination for the distribution of labels where there are not direct adjacencies (typically in VPN applications), then there are other implications. In these scenarios, labels for the client level are distributed by protocols such as MP-BGP or extended LDP adjacencies that do not require the protocol entities to be directly adjacent at the specific hierarchical level. The protocol handshake between the primary and secondary LERs in this scenario is not required to exchange sufficient information to perfectly mimic the MP-BGP or LDP protocol such that the switchover appears seamless to the far end protocol termination. Upon occurrence of a failover from the primary LER to the secondary LER, according to one embodiment of the invention, the failover is made to look like a software module restart rather than a hardware failure. By making the changeover appear as a software module restart, there is not normally a reset of the state communicated by the signaling and the associated tunnels will not need to be torn down and rebuilt, since the system will assume that there was only a recoverable software outage while the forwarding plane of the device experiencing the failure was unaffected. This will enable the secondary LER to pick up where the primary LER left off without requiring additional time and resources to reestablish all of the MPLS tunnels being handled by the primary LER. There are numerous mechanisms for handling software resets (FT-LDP, BGP restart etc.) and the invention is not limited to any particular mechanism but rather extends to all suitable mechanisms.

Broadcast Domain

A virtual router is a collection of threads, either static or dynamic, in a routing device, that provides routing and forwarding services much like physical routers. A virtual router need not be a separate operating system process (although it could be); it simply has to provide the illusion that a dedicated router is available to satisfy the needs of the network(s) to which it is connected. A virtual router, like its physical counterpart, is an element in a routing domain. The other routers in this domain could be physical or virtual routers themselves.

A protocol referred to herein as Virtual Router Redundancy Protocol (VRRP), specifies an election protocol for use in a broadcast domain that dynamically assigns responsibility for a virtual router to one of the VRRP routers on a local area network. This allows any of the virtual router IP (internet protocol) addresses on the local area network (LAN) to be used as the default first hop router by end-hosts. VRRP is described in greater detail in IETF RFC 2338, the content of which is hereby incorporated herein by reference.

According to one embodiment of the invention, VRRP is augmented to enable two or more routers to share an identity such that one of the routers can function as a "hot standby" for the other. It is combined with a "keep alive" mechanism such that when the standby router detects a failure of the primary, it is able to then impersonate the primary router and the switchover will occur transparently to devices statefully configured to use the primary router.

Use of VRRP enables the routers to use the broadcast domain capabilities so that no reconfiguration or special protocol handling is needed by the customer edge or other device to direct traffic to the primary when fail over of the boundary network device occurs. This extension to VRRP is used to provide a combination of promiscuous receive in the broadcast domain 10, while ensuring that inappropriate replication of traffic does not occur into the broadcast domain 10 and into the MPLS domain.

According to one aspect of the invention, each boundary network device platform is treated analogously to a router in the VRRP scheme for routers, and is partitioned into a (small) number of virtual boundary network devices. Boundary network devices whose platforms share access to the same broadcast domain can be formed into a boundary network device redundancy group. All boundary network devices in a redundancy group are configured to have knowledge of each other. This analogue of the VRRP protocol ensures dynamically that one boundary network device will be designated as the master and all others will be designated as stand-bys. Only the master boundary network device forwards customer traffic, thus avoiding inappropriate duplication of traffic into the broadcast domain 10.

Figure 5:
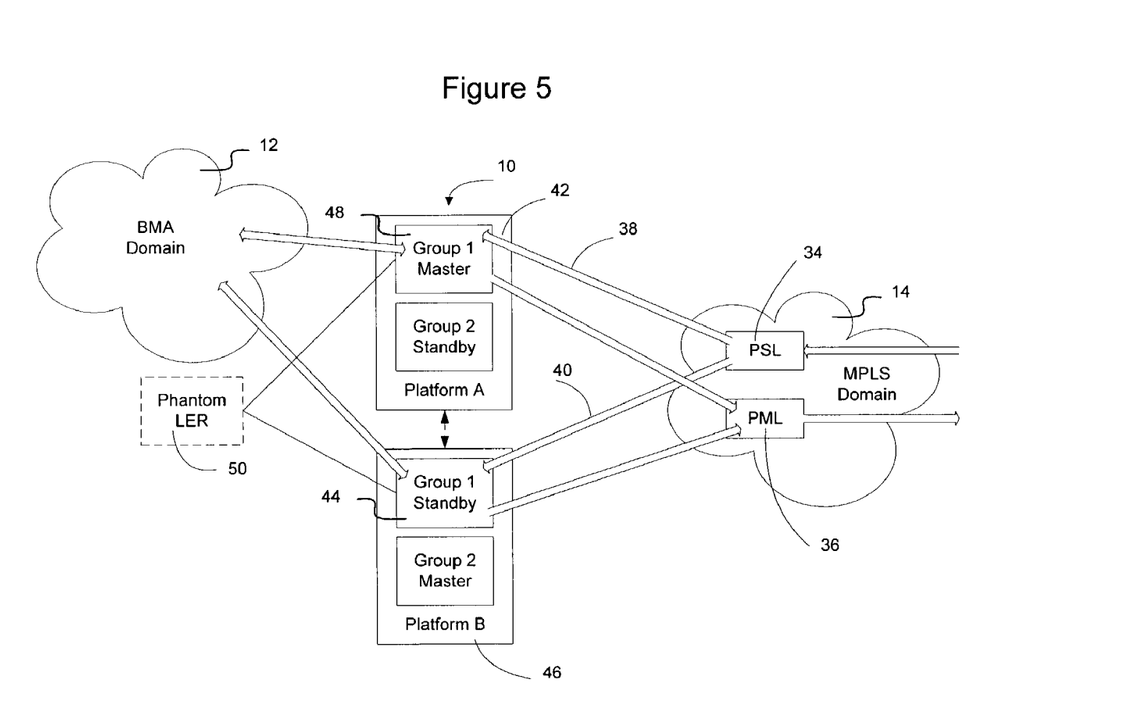
FIG. 5 is a functional block diagram illustrating an example of redundant network devices at an BMA-MPLS hierarchical boundary.

The master and standby boundary network devices also need to be established as the primary and secondary LERs in the MPLS domain. This may be effected, according to one aspect of the invention, by causing these network devices to impersonate LSRs through the use of a phantom LER 50 as discussed in greater detail above. Both domains will therefore automatically select the same network devices in the event of a failure in the network. Accordingly, boundary network devices no longer represent a single point of failure at a hierarchical boundary between BMA and MPLS domains.

FIG. 5 depicts a simple load sharing organization of two platforms (A & B), each supporting two boundary network devices, the four boundary network devices being configured into two redundancy groups (Group 1 and Group 2). In the case of a failure or loss of transport connectivity of one of the platforms, the standby boundary network device on the other platform will take over operations for any master affected by the failure. For example, if there is a failure on platform A 42, the boundary network device (Group 1 standby 44) on platform B 46 will take over for the failed boundary network device (Group 1 master 48) on platform A. If any redundancy group has more than one standby boundary network device, an election process will be used to elect the new master boundary network device. The invention is not limited to any particular election process for selecting a new master boundary network device.

After taking over for the old master boundary network device, the new master boundary network device assumes the identity of the old master boundary network device to the outside world (redundancy group MAC address) on the broadcast side and for service label distribution protocols (BGP, extended LDP adjacencies etc.) on the MPLS side. In normal operation, as shown in FIG. 3, the masters of the redundancy groups will be distributed across the various platforms to minimize impact on the redundancy groups should any one of the platforms experience a failure, although the invention is not limited to this embodiment.

Conventional virtual private networks (VPNs) can be formed by connecting boundary network devices to each other over the MPLS domain 14 with transport tunnels. Packets for each VPN that a boundary network device serves are identified by one or more VC or service labels, carried in the transport tunnels. According to one aspect of the invention, the configuration of transport tunnels is modified such that transport tunnels are established for each default master boundary network device (the default master boundary network device is the boundary network device that is master when there is no fault situation). This enables the same number of transport tunnels to be used in the redundant scheme according to the invention as were previously used in the non-redundant scheme.

In operation, each VPN customer site is assigned to a redundancy group. Depending on the type of VPN being supported, the redundancy group may appear to the customer edge as an Ethernet end system (Layer 3 VPNs, or the PE-Core as seen by the PE-Edge) or as a transparent bridge (layer 2 VPN, VPLS). In the former case, the redundancy group is assigned a locally administered MAC address, which is used as a MAC-SA by the master boundary network device whenever it is forwarding packets toward the customer edge. When the first learning bridge receives a packet from a new master, it learns the port on which the packet arrived, and will forward packets addressed to that redundancy group back on the same port. Thus, changeover of customer edge—provider edge traffic can be very rapid, just as soon as the newly designated master boundary network device uses the shared MAC-SA.

Where the boundary network device appears to the customer edge 22 as a transparent bridge, more MAC learning is required. In this situation, after a change of platform by the master, all of the learned MAC addresses that were arriving on the old port (to the failed platform) will be learned one by one as they appear on the port coming from the new master boundary network device.

All boundary network devices in a redundancy group maintain a forwarding table or equivalent for each VPN that the redundancy group serves. During normal operation, the state of the master boundary network device is replicated in the stand-by PE(s) via protocol exchange. This is not likely to be an onerous requirement because, although the total amount of information in the state tables is potentially large, significant changes only occur with the addition or deletion of VPN service to customer sites. In MPLS, it may be a service objective not to lose dynamic information such as learned MAC address but the consequences of not maintaining them should not be severe, since packets can be flooded until the tables re-populate. For Layer 3 VPNs, the routes advertised by each customer site are likely to remain static for long periods of time (if they are not statically provisioned in the first place) and so replicating them to the standby boundary network devices is not a problem.

On the broadcast side, customer traffic is directed to the master boundary network device associated with the virtual private network (VPN). If the customer edge 22 is forwarding traffic for multiple VPNs (layer 3, or layer 2, or VPLS) then there may be a different master boundary network device for each VPN for that customer edge. On the MPLS side, incoming traffic is directed to the master boundary network device (as it has assumed the primary signaling identity), as discussed in greater detail above.

As discussed above, packets from the customer edges will arrive at the new master boundary network device as soon as the required learning takes place in the broadcast domain (which could be as soon as a single packet arrives at the first bridge downstream of the new master boundary network device). The new master boundary network device has the tables to select the correct VC/service label for the packets and knows the identity of the transport tunnel over which they should be forwarded. The new master boundary network device will send the packets over the reverse recovery path established from the phantom LER 50 towards the next hop router (which is the PML for this recovery path) and so forward them onto the correct transport tunnel over the network forming the MPLS domain 14.

Figure 6:
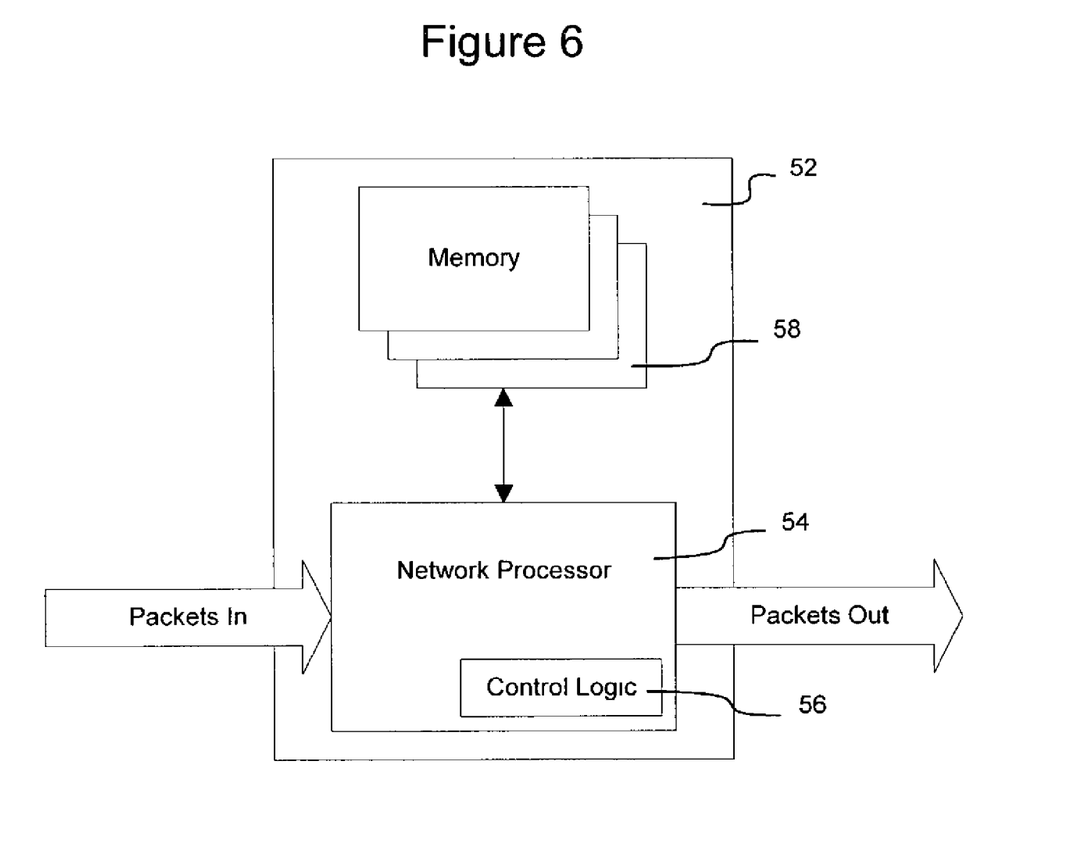
FIG. 6 is a functional block diagram of an example of a boundary network device.

One example of a boundary network device that may be used in connection with the various embodiments of this invention is illustrated in FIG. 6. As shown in FIG. 6, a boundary network device 52 configured to receive packets and output packets includes, in this embodiment, a network processor 54 with control logic 56 configured to implement the functions described in greater detail above. A memory 58, internal to the network device 52 as shown, or external to the network device 52, may be provided to store computer instructions to enable the network device 52 to perform the functions ascribed to it herein.

The control logic 56 of network device 52 may be implemented as a set of program instructions that are stored in a computer readable memory 58 within the network device 52 and executed on a microprocessor, such as network processor 54, within the network device 52. However, it will be apparent to a skilled artisan that all logic described herein can be embodied using discrete components, integrated circuitry, programmable logic used in conjunction with a programmable logic device such as a Field Programmable Gate Array (FPGA) or microprocessor, or any other device including any combination thereof. Programmable logic can be fixed temporarily or permanently in a tangible medium such as a read-only memory chip, a computer memory, a disk, or other storage medium. Programmable logic can also be fixed in a computer data signal embodied in a carrier wave, allowing the programmable logic to be transmitted over an interface such as a computer bus or communication network. All such embodiments are intended to fall within the scope of the present invention.

It should be understood that various changes and modifications of the embodiments shown in the drawings and described in the specification may be made within the spirit and scope of the present invention. Accordingly, it is intended that all matter contained in the above description and shown in the accompanying drawings be interpreted in an illustrative and not in a limiting sense. The invention is limited only as defined in the following claims and the equivalents thereto.

What is claimed is:

1. A method of establishing redundant boundary network devices at a hierarchical boundary, the method comprising the steps of:
   impersonating, in a first multiprotocol label switching (MPLS) domain, a first label switch router (LSR) by a first label edge router (LER); and
   impersonating, in the first MPLS domain, a second LSR by a second LER;
   wherein the step of impersonating the first LSR by the first LER comprises advertising an ability to forward traffic to a first phantom LER, and wherein the step of impersonating the second LSR by the second LER comprises advertising an ability to forward traffic to the first phantom LER.

2. The method of claim 1, wherein the step of impersonating the first LSR by the first LER comprises mapping traffic originated into the MPLS domain through the first LER as being on a first path originating at the first phantom LER, and wherein the step of impersonating the second LSR by the second LER comprises mapping traffic originating into the MPLS domain through the second LER as being on a second path originating at the first phantom LER.

3. The method of claim 2, wherein the first path is a working path and the second path is a backup path.

4. The method of claim 1, further comprising the step of communicating, from the first LER to the second LER, information relevant to label switched paths through the first MPLS domain.

5. The method of claim 1, wherein the step of impersonating the first LSR by the first LER further comprises establishing the first LER as having a preferred route to the first phantom LER.

6. A method of establishing redundant boundary network devices at a hierarchical boundary, the method comprising the steps of:
   impersonating, in a first multiprotocol label switching (MPLS) domain, a first label switch router (LSR) by a first label edge router (LER);
   impersonating, in the first MPLS domain, a second LSR by a second LER;
   impersonating, in a second MPLS domain, a third LSR by a third LER; and
   impersonating, in the second MPLS domain, a fourth LSR by a fourth LER.

7. The method of claim 6, wherein the step of impersonating the third LSR by the third LER comprises advertising an ability to forward traffic to a second phantom LER, and wherein the step of impersonating the fourth LSR by the fourth LER comprises advertising an ability to forward traffic to the second phantom LER.

8. The method of claim 6, wherein the step of impersonating the third LSR by the third LER comprises mapping traffic originated into the second MPLS domain through the third LER as being on a third path originating at a second phantom LER, and wherein the step of impersonating the fourth LSR by the fourth LER comprises mapping traffic originated into the second MPLS domain through the fourth LER as being on a fourth path originating at the second phantom LER.

9. The method of claim 8, wherein the third path is a working path and wherein the fourth path is a backup path.

10. The method of claim 6, further comprising the step of communicating, from the third LER to the fourth LER, information relevant to label switched paths through the second MPLS domain.

11. The method of claim 7, wherein the step of impersonating the third LSR by the third LER further comprises establishing the third LER as having a preferred route to the second phantom LER.

12. The method of claim 1, further comprising the step of:
   establishing, in a broadcast domain, a redundancy group containing at least a first network device and a second network device.

13. The method of claim 12, wherein the first network device is the first LER, and wherein the second network device is the second LER.

14. The method of claim 12, wherein the first network device is a master router and wherein the second network device is a backup router.

15. The method of claim 14, wherein the master router is hosted on a first platform, and wherein the backup router is hosted on a second platform.

16. The method of claim 15, wherein the master router and the backup router are virtual routers.

17. The method of claim 16, wherein the master router has state tables, and wherein the state tables of the master router are replicated to the backup router.

18. The method of claim 12, further comprising exchanging routing information between the first network device and the second network device.

19. A redundancy group of network devices, comprising:
a first label edge router (LER) having control logic configured to impersonate, in a first multiprotocol label switching (LER) domain, a first label switch router (LSR); and
a second LER having control logic configured to impersonate, in the first MPLS domain, a second LSR;
wherein the control logic of the first LER impersonates the first LSR by advertising an ability to forward traffic to a first phantom LER, and wherein the control logic of the second LER impersonates the second LSR by advertising an ability to forward traffic to the first phantom LER.

20. The redundancy group of claim 19, wherein the control logic of the first LER impersonates the first LSR by mapping traffic originated into the MPLS domain through the first LER as being on a first path originating at the first phantom LER, and wherein the control logic of the second LER impersonates the second LSR by mapping traffic originated into the MPLS domain through the second LER as being on a second path originating at the first phantom LER.

21. The redundancy group of claim 20, wherein the first path is a working path and the second path is a backup path.

22. The redundancy group of claim 19, wherein the control logic of the first LER is further configured to communicate information relevant to label switched paths through the first MPLS domain to the second LER.

23. The redundancy group of claim 19, wherein the control logic of the first LER is further configured to establish the first LER as having a preferred route to the first phantom LER.

24. A redundancy group of network devices, comprising:
a first label edge router (LER) having control logic configured to impersonate, in a first multiprotocol label switching (MPLS) domain, a first label switch router (LSR); and
a second LER having control logic configured to impersonate, in the first MPLS domain, a second LSR;
wherein the control logic of the first LER is further configured to impersonate a third LSR in a second MPLS domain; and
wherein the control logic of the second LER is further configured to impersonate a fourth LSR in the second MPLS domain.

25. The redundancy group of claim 24, wherein the control logic of the first LER is configured to impersonate the third LSR by advertising an ability to forward traffic to a second phantom LER, and wherein the control logic of the second LER is configured to impersonate the fourth LSR by advertising an ability to forward traffic to the second phantom LER.

26. The redundancy group of claim 24, wherein the control logic of the first LER is configured to impersonate the third LSR by mapping traffic originated into the second MPLS domain through the third LER as being on a third path originating at a second phantom LER, and wherein the control logic of the second LER is configured to impersonate the fourth LSR by mapping traffic originated into the second MPLS domain through the fourth LER as being on a fourth path originating at the second phantom LER.

27. The redundancy group of claim 26, wherein the third path is a working path and wherein the fourth path is a backup path.

28. The redundancy group of claim 24, wherein the control logic of the third LER is further configured to communicate information relevant to label switched paths through the second MPLS domain to the fourth LER.

29. The redundancy group of claim 25, wherein the control logic of the third LER is further configured to establish the third LER as having a preferred route to the second phantom LER.

30. The redundancy group of claim 19,
wherein the control logic of the first LER is configured to establish itself, in a broadcast domain, as a first member of a redundancy group; and
wherein the control logic of the second LER is configured to establish itself, in the broadcast domain, as a second member of the redundancy group.

31. The redundancy group of claim 30, wherein the first member is a master router and wherein the second member is a backup router.

32. The redundancy group of claim 31, wherein the first member and second member are virtual routers.

33. The redundancy group of claim 32, wherein the first member has state tables, and wherein the state tables of the first member are replicated to the second member.

* * * * *